March 2, 1926.
J. E. COLBERT
TOOL
Filed May 11, 1925
1,575,192
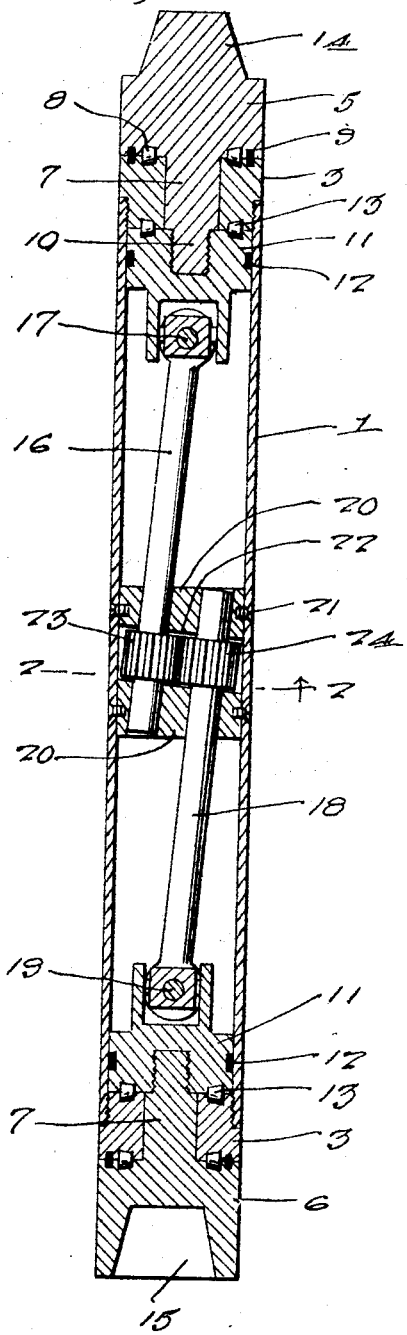
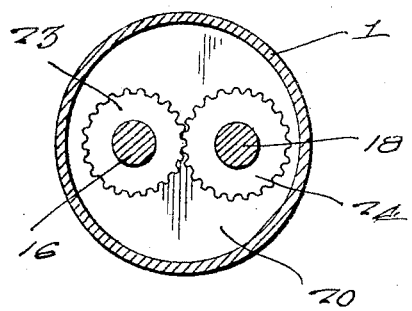
Inventor
J. E. Colbert
By
Clarence A. O'Brien
Attorney Patented Mar. 2, 1926.

1,575,192.

UNITED STATES PATENT OFFICE.

JOHN E. COLBERT, OF TUPMAN, CALIFORNIA, ASSIGNOR OF ONE-HALF TO FRANK R. GIDDENS, OF TUPMAN, CALIFORNIA.

TOOL.

Application filed May 11, 1925. Serial No. 29,482.

*To all whom it may concern:*

Be it known that I, JOHN E. COLBERT, a citizen of the United States, residing at Tupman, in the county of Kern and State of California, have invented certain new and useful Improvements in a Tool, of which the following is a specification.

The present invention relates to a tool for changing rotary motion in one direction to rotary motion in the opposite direction.

The tool is designed particularly for use in unscrewing pipes or casings in deep wells so as to do away with the necessity of using all left handed drill pipes and the like especially in running fishing tools and in all places where a reverse motion is desired.

Another important object of the invention is to provide a tool of this nature which possesses an exceedingly simple and compact structure which is easy to manipulate for the use intended.

Another important object of the invention is to provide a tool of this nature which will prove strong and durable in use, beside being thoroughly efficient and reliable and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a longitudinal section through the tool embodying the features of my invention, and Figure 2 is a transverse section therethrough, taken substantially on the line 2—2 of Figure 1.

Referring to the drawing in detail it will be seen that 1 designates a cylindrical body or casing having internal threads at its ends for receiving collars 3 which form bearings. Tool engaging members 5 and 6 are provided with reduced extensions 7 adapted to be rotatably received in the bearing collars 3. Cone roller bearings 8 are disposed between the members 5 and the outer faces of the collars 3 as are also suitable packing rings 9. The inner ends of the extensions 7 are provided with threaded projections 10 which receive blocks 11 which are rotatable in the casing 1 having packing rings 12 disposed thereabout for engaging the inner surface of the casing. Cone roller bearings 13 are disposed between the abutting faces of the collars 3 and 11. The tool engaging member 5 is provided with a tool joint pin 14, while the member 6 is provided with a tool joint socket 15. A shaft 16 is connected to the block 11 attached to the member 5 by means of a universal joint 17. A similar shaft 18 is attached to the other block 11 by a similar universal joint 19. These shafts 16 and 18 extend beyond the center of the casing 1, and are disposed in parallel relation to each other and diagonally to the casing. A pair of spaced bearing blocks 20 are mounted in the central portion of the casing 1 by means of screws 21, and receive the inner ends of the shafts.

The inner faces 22 of these bearing blocks 20 are disposed in parallelism and extend diagonally across the casing. Gears 23 and 24 are fixed on the shafts 16 and 18 respectively and are in mesh with each other. It will, therefore be seen that the rotation of the member in one direction will cause rotation of the member 6 in an opposite direction and vice versa.

It is thought that the construction, operation, and advantages of this invention will be clearly understood without a more detailed description thereof. It is desired however, to point out that numerous changes in the details of construction and in the combination and arrangement of parts may be resorted to without departing from the spirit or scope of the invention as hereinafter claimed or sacrificing any of its advantages.

Having thus described the invention, what I claim as new is:—

1. In a tool of the class described, an elongated casing, tool engaging members rotatably mounted in the ends of the casing, a pair of spaced bearing blocks mounted in the central portion of the casing in spaced relation to each other, shafts extending longitudinally of the casing and journaled through said blocks, gears on the shafts between the blocks and meshing with each other.

2. In a tool of the class described, an elongated cylindrical casing, collars threaded in the ends of said casings, tool engaging members having reduced extensions journaled in the collars, blocks engaged with the extensions within the casing and journaled in the casing, shafts extending longitudinally of the casing in parallel spaced relation to each other and diagonally of the axis of the casing, universal joints disposed between the shafts and the adjacent blocks, a pair of bearing blocks disposed centrally of the casing in parallel spaced relation, said shafts being journaled through said journal blocks, and gears on said shafts between said blocks and meshing with each other.

In testimony whereof I affix my signature.

JOHN E. COLBERT.